US008896568B2

(12) United States Patent
Liu et al.

(10) Patent No.: US 8,896,568 B2
(45) Date of Patent: Nov. 25, 2014

(54) TOUCH SENSING METHOD AND APPARATUS USING THE SAME

(75) Inventors: Jui-Ming Liu, Tainan (TW); Shen-Feng Tai, Tainan (TW)

(73) Assignee: Himax Technologies Limited, Tainan (TW)

( * ) Notice: Subject to any disclaimer, the term of this patent is extended or adjusted under 35 U.S.C. 154(b) by 282 days.

(21) Appl. No.: 13/108,187

(22) Filed: May 16, 2011

(65) Prior Publication Data

US 2012/0293443 A1    Nov. 22, 2012

(51) Int. Cl.
G06F 3/044        (2006.01)
G06F 3/041        (2006.01)

(52) U.S. Cl.
CPC ............. *G06F 3/041* (2013.01); *G06F 3/044* (2013.01)
USPC ..................................................... 345/174

(58) Field of Classification Search
CPC ...................................................... G06F 3/044
See application file for complete search history.

(56) References Cited

U.S. PATENT DOCUMENTS

| 2004/0056845 | A1* | 3/2004 | Harkcom et al. | 345/173 |
| 2009/0262103 | A1* | 10/2009 | Huang | 345/212 |
| 2010/0214232 | A1* | 8/2010 | Chan et al. | 345/173 |
| 2011/0115717 | A1* | 5/2011 | Hable et al. | 345/173 |

FOREIGN PATENT DOCUMENTS

| CN | 101896878 | 11/2010 |
| JP | H05204529 | 8/1993 |
| TW | 201110007 | 3/2011 |

OTHER PUBLICATIONS

"Office Action of Taiwan Counterpart Application", issued on Jan. 3, 2014, p. 1-p. 5, in which the listed references were cited.

* cited by examiner

*Primary Examiner* — Jason Olson
*Assistant Examiner* — Carl Adams
(74) *Attorney, Agent, or Firm* — J.C. Patents

(57) ABSTRACT

A touch sensing method adapted for a touch panel is provided. The touch sensing method includes following steps. An average value of touch values generated by a touch object on the touch panel is calculated during a first frame period. An amplitude value of the touch values generated by the touch object on the touch panel is calculated based on the average value during a second frame period. Whether the touch object is a target to be sensed is determined based on the amplitude value. Furthermore, a touch sensing apparatus is also provided.

10 Claims, 5 Drawing Sheets

TOUCH SENSING METHOD AND APPARATUS USING THE SAME

BACKGROUND OF THE INVENTION

1. Field of the Invention

The invention relates to a sensing method and an apparatus using the same, and more particularly relates to a touch sensing method and an apparatus using the same.

2. Description of Related Art

In this information era, reliance on electronic products is increasing day by day. The electronic products including notebook computers, mobile phones, personal digital assistants (PDAs), digital walkmans, and so on are indispensable in our daily lives. Each of the aforesaid electronic products has an input interface for a user to input his or her command, such that an internal system of each of the electronic product spontaneously runs the command. At this current stage, the most common input interface includes a keyboard and a mouse.

From the user's aspect, it is sometimes rather inconvenient to use the conventional input interface including the keyboard and the mouse. Manufacturers aiming to resolve said issue thus start to equip the electronic products with touch input interfaces, e.g. touch pads or touch panels, so as to replace the conditional keyboards and mice. At present, the users' commands are frequently given to the electronic products by physical contact or sensing relationship between users' fingers or styluses and the touch input interfaces.

For touch panels, capacitive touch input interfaces are usually highly sensitive. When the touch sensing function is performed, the effect of oil smudge of touch objects and other dirt is inevitable. Accordingly, how to control the touch sensing apparatus to properly determine whether the touch object is a target to be sensed is one of the important issues at present.

SUMMARY OF THE INVENTION

The invention is directed to a touch sensing method capable of controlling a touch sensing apparatus to properly determine whether the touch object is a target to be sensed based on distinguishing characteristics of touch objects.

The invention is directed to a touch sensing apparatus capable of properly determining whether the touch object is a target to be sensed.

The invention provides a touch sensing method adapted for a touch panel. The touch sensing method includes following steps. An average value of touch values generated by a touch object on the touch panel is calculated during a first frame period. An amplitude value of the touch values generated by the touch object on the touch panel is calculated based on the average value during a second frame period. Whether the touch object is a target to be sensed is determined based on the amplitude value.

In an embodiment of the invention, the step of determining whether the touch object is the target to be sensed includes following steps. Whether the amplitude value is larger than a preset amplitude value is determined to determine whether the touch object is the target to be sensed.

In an embodiment of the invention, the touch sensing method further includes following steps. Whether the touch values generated by the touch object on the touch panel are larger than a preset threshold value is determined. When the touch values are larger than the preset threshold value, the average value of the touch values generated by the touch object is calculated during the first frame period.

In an embodiment of the invention, the touch sensing method further includes following steps. The frame numbers are counted to respectively define the first frame period and the second frame period.

The invention provides a touch sensing apparatus adapted for a touch panel. The touch sensing apparatus includes a calculation unit and a determination unit. The calculation unit calculates an average value of touch values generated by a touch object on the touch panel during a first frame period. The calculation unit calculates an amplitude value of the touch values generated by the touch object on the touch panel based on the average value during a second frame period. The determination unit determines whether the touch object is a target to be sensed based on the amplitude value.

In an embodiment of the invention, the determination unit determines whether the amplitude value is larger than a preset amplitude value to determine whether the touch object is the target to be sensed.

In an embodiment of the invention, the determination unit determines whether the touch values generated by the touch object on the touch panel are larger than a preset threshold value. When the touch values are larger than the preset threshold value, the calculation unit calculates the average value of the touch values generated by the touch object during the first frame period.

In an embodiment of the invention, the touch values are variations of capacitances generated by the touch object on the touch panel.

In an embodiment of the invention, the amplitude value of the touch values is a peak-to-peak value of the variations of capacitances generated by the touch object on the touch panel.

In an embodiment of the invention, the first frame period and the second frame period respectively include a plurality of frame numbers.

In an embodiment of the invention, the calculation unit includes a counter unit. The counter unit counts the frame numbers to respectively define the first frame period and the second frame period.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
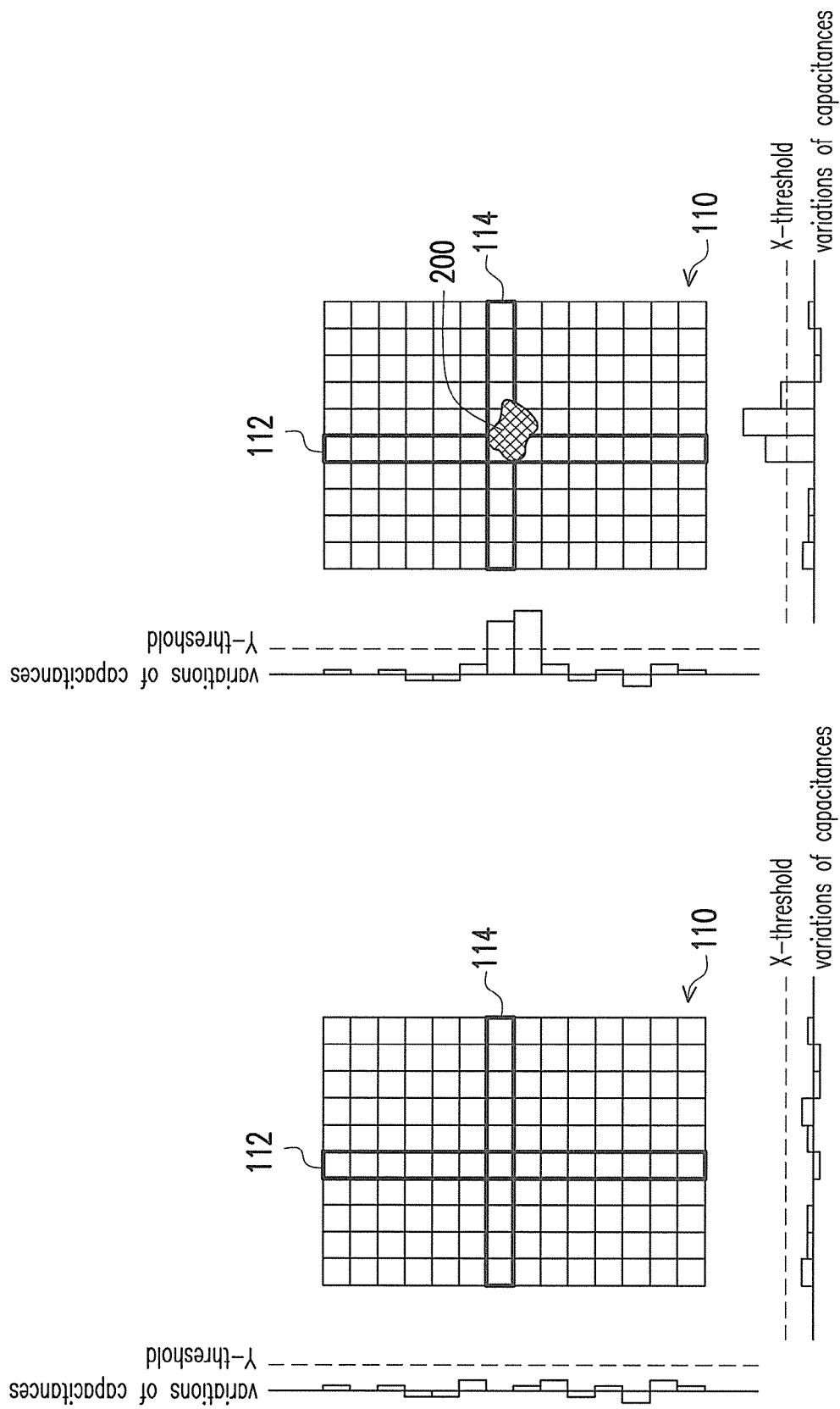
FIG. 1A and FIG. 1B respectively show variations of capacitances of sensing channels of the same touch panel in different situations.

FIG. 1A and FIG. 1B respectively show variations of capacitances of sensing channels of the same touch panel in different situations. Referring to FIG. 1A and FIG. 1B, generally speaking, the touch panel 110 usually includes a plurality of sensing channels 112 arranged in X-direction and a plurality of sensing channels 114 arranged in Y-direction. The sensing channels 112 and 114 are respectively configured to sense variations of capacitances on the touch panel 110 due to a touch object.

The situation shown in FIG. 1A indicates that users have not performed a touch operation on the touch panel 110 yet. Accordingly, regardless of the sensing channels 112 or 114, variations of capacitances sensed thereby are not larger than the X-threshold and the Y-threshold. In the meanwhile, the touch panel 110 would report nothing.

On the other hand, the situation shown in FIG. 1B indicates that variations of capacitances are generated on the touch panel 110 due to oil smudge of touch objects and other dirt. As shown in FIG. 1B, in the area covered under the dirt 200, the sensing channels 112 and 114 corresponding thereto on the touch panel 110 would generate variations of capacitances. Accordingly, when the variations of capacitances are larger than the X-threshold and the Y-threshold, the touch panel 110 would report the coordinate points of the dirt 200. However, oil smudge of touch objects and other dirt are usually not the target to be sensed by the touch panel 110.

Accordingly, the exemplary embodiments of the invention provides a touch sensing method capable of controlling a touch sensing apparatus to properly determine whether the touch object is a target to be sensed. In the exemplary embodiments of the invention, compared with users' fingers or styluses, oil smudge of touch objects and other dirt are not the target to be sensed by the touch panel 110.

Figure 2:
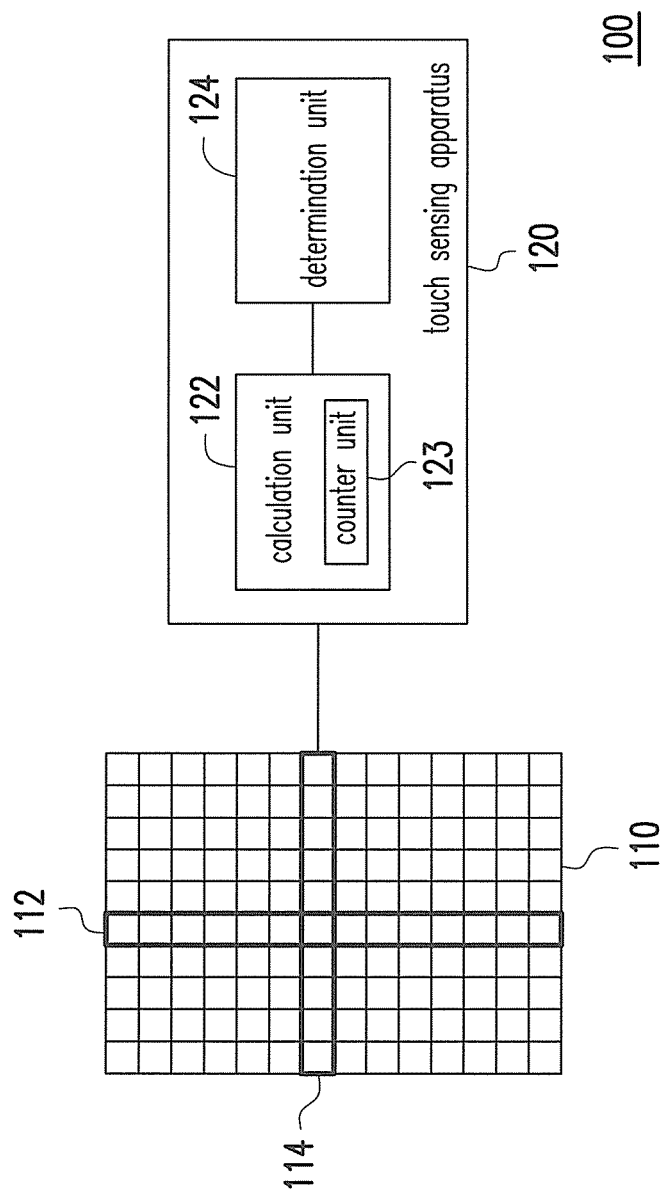
FIG. 2 shows a block diagram of a touch sensing system according to an embodiment of the invention.
Figure 3A:
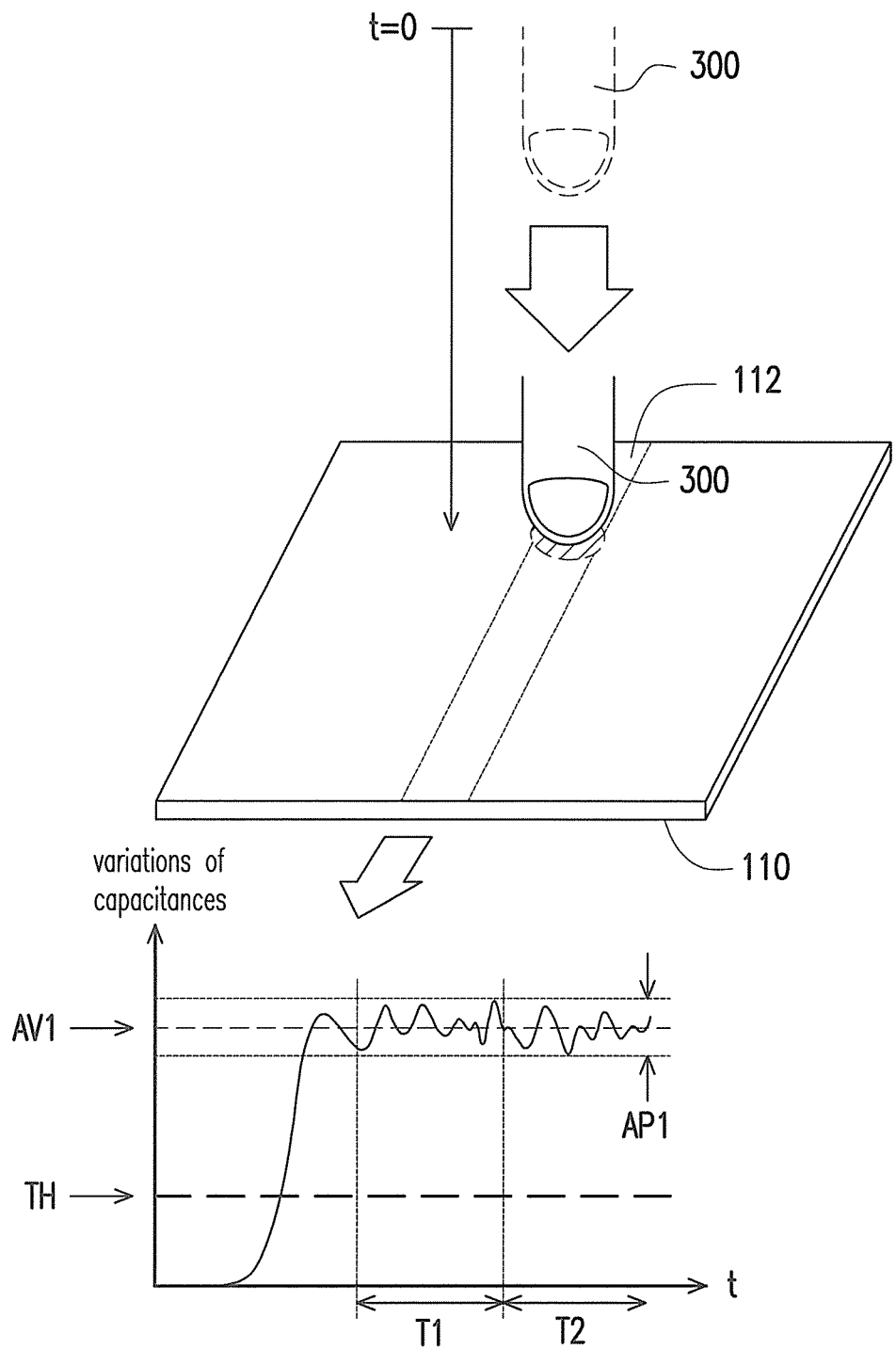
FIG. 3A and FIG. 3B respectively show variations of capacitances of sensing channels of the same touch panel in different situations.
Figure 3B:
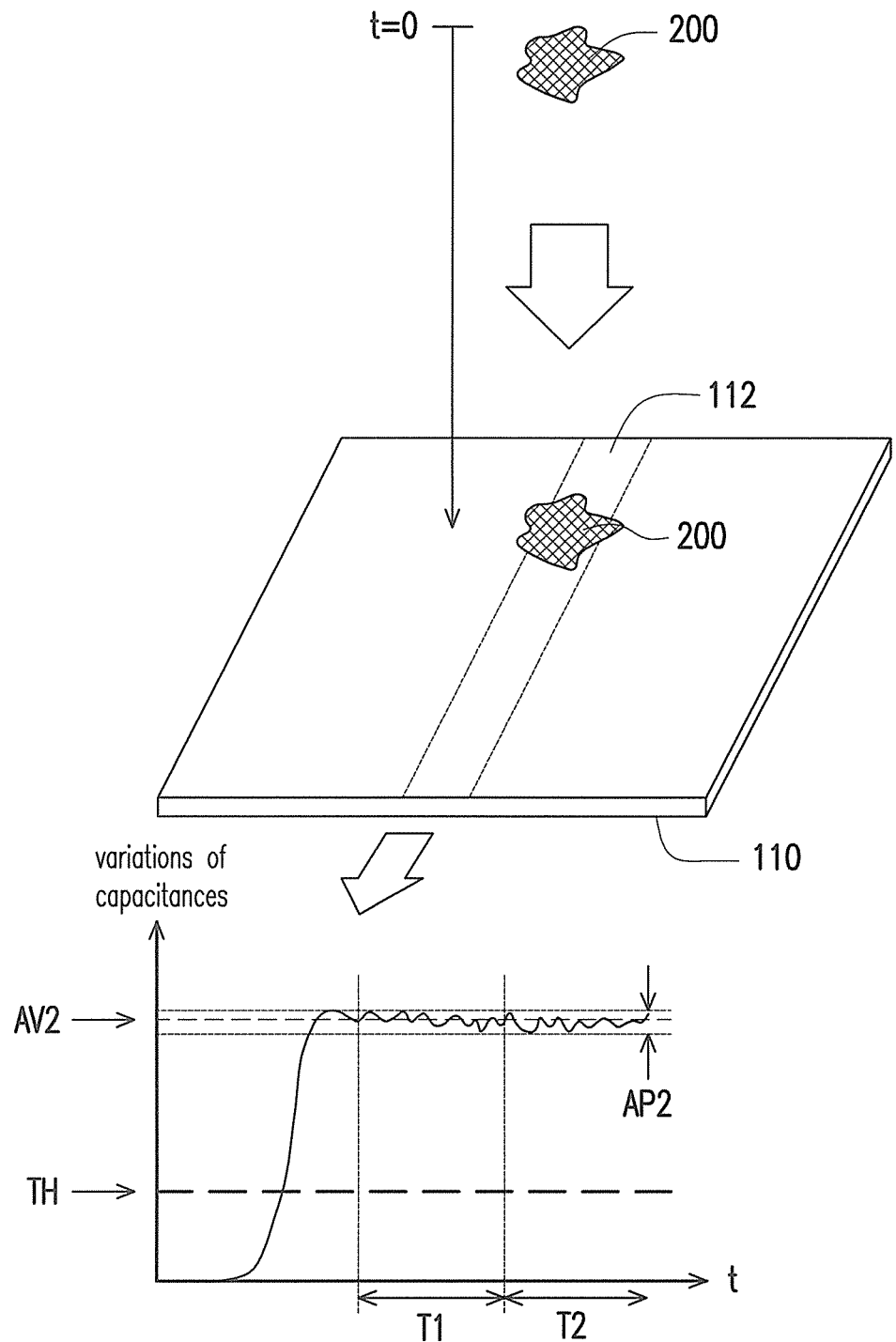

FIG. 2 shows a block diagram of a touch sensing system according to an embodiment of the invention. FIG. 3A and FIG. 3B respectively show variations of capacitances of sensing channels of the same touch panel in different situations. The situation shown in FIG. 3A indicates that users perform a touch operation on the touch panel 110. The situation shown in FIG. 3B indicates that variations of capacitances are produced on the touch panel 110 due to oil smudge of touch objects and other dirt.

Referring to FIG. 2 to FIG. 3B, the touch sensing system 100 of the present embodiment includes the touch panel 110 and a touch sensing apparatus 120, wherein the touch sensing apparatus 120 includes a calculation unit 122 and a determination unit 124, and the calculation unit 122 includes a counter unit 123.

In the present embodiment, the counter unit counts the frame numbers of the touch panel 110 to respectively define the first frame period T1 and the second frame period T2. Herein, the first frame period T2 includes 8 frame numbers, and the second frame period T2 includes 12 frame numbers.

Taking FIG. 3A for example, when the touch object 300 contacts the touch panel 110, the touch object 300 would generate touch values on the touch panel 110. In the present embodiment, the touch values are variations of capacitances generated by the touch object 300 on the touch panel 110, which vary along with time. The situation shown in FIG. 3A indicates that variations of capacitances of the sensing channels 112 arranged in X-direction. Furthermore, in FIG. 3A, the user's finger are exemplary for the touch object 300, and the invention is not limited thereto.

Next, the determination unit 124 determines whether variations of capacitances generated by the touch object 300 on the touch panel 110 are larger than a preset threshold value TH. When the variations of capacitances are larger than the preset threshold value TH, the calculation unit 122 calculates the average value AV1 of the variations of capacitances generated by the touch object 300 during the first frame period T1.

Thereafter, the calculation unit 110 calculates an amplitude value AP1 of the variations of capacitances generated by the touch object 300 on the touch panel 110 based on the average value AV1 during a second frame period T2. Herein, the amplitude value AP1 is, for example, a peak-to-peak value of variations of capacitances generated by the touch object 300 on the touch panel 110. Next, the determination unit 124 determines whether the amplitude value AP1 is larger than a preset amplitude value N to determine whether the touch object 300 is the target to be sensed.

On the other hand, in FIG. 3B, the touch object, for example, is the dirt 200. Generally speaking, variations of capacitances generated by different touch objects on the touch panel 110 are different. Accordingly, when the touch panel 110 senses the dirt 200, the average value AV2 and the amplitude value AP2 obtained by the calculation unit 122 are different from the average value AV1 and the amplitude value AP1 shown in FIG. 3A. Therefore, because different touch objects have different amplitude values, the designer can change the preset amplitude value N according to actual demands, such that the touch sensing apparatus 120 can properly determines whether the touch object is a target to be sensed. In the present embodiment, compared with oil smudge of touch objects and other dirt, users' fingers or styluses are the target to be sensed by the touch panel 110.

Figure 4:
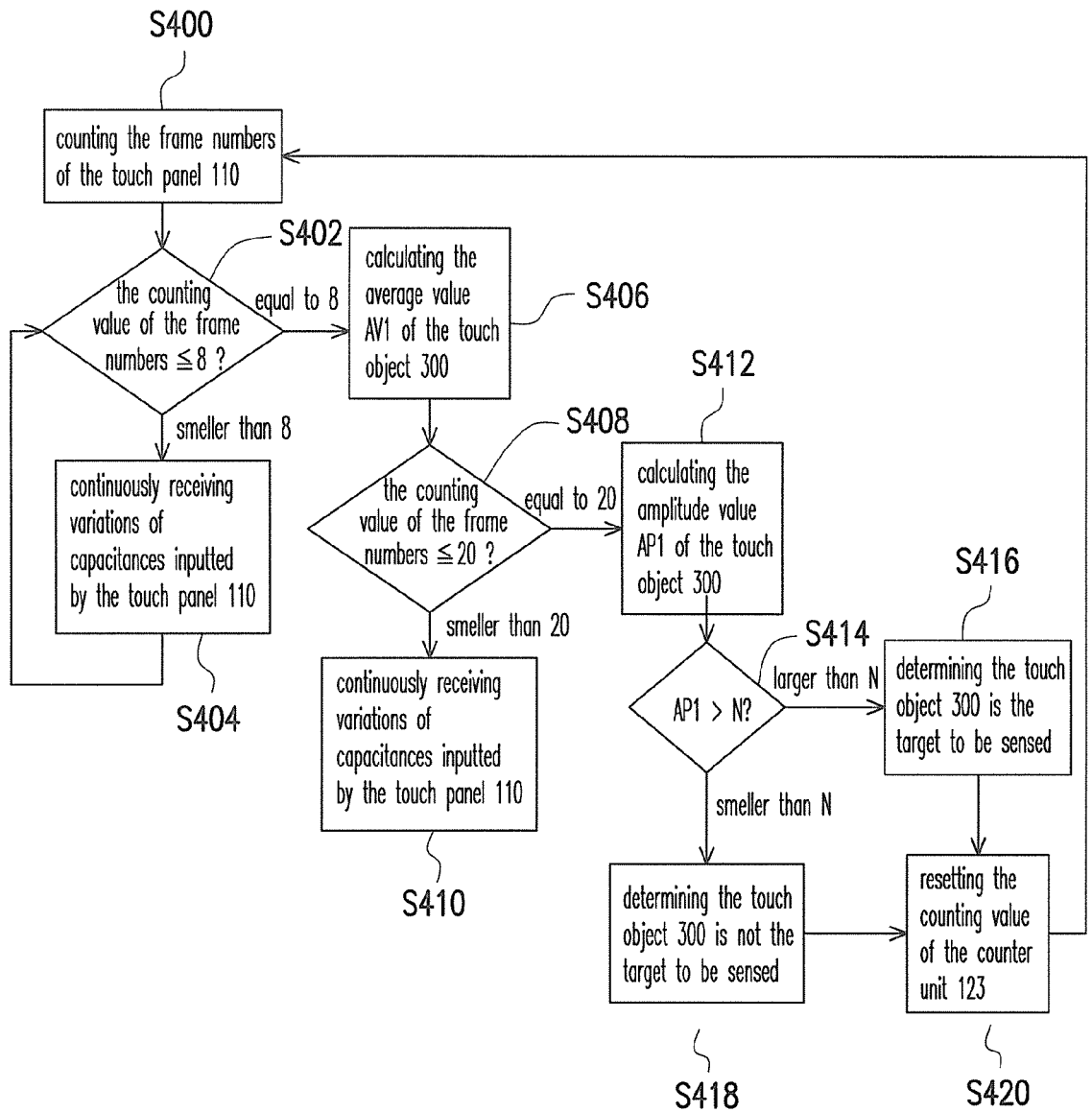
FIG. 4 shows a flowchart of a touch sensing method according to an embodiment of the invention.

FIG. 4 shows a flowchart of a touch sensing method according to an embodiment of the invention. Referring to FIG. 2 to FIG. 4, the touch sensing method of the present embodiment, for example, can be performed on the touch sensing apparatus 120. In step S400, the counter unit 123 counts the frame numbers of the touch panel 110 to respectively define the first frame period T1 and the second frame period T2. In the present embodiment, the first frame period T1 includes 8 frame numbers, and the second frame period T2 includes 12 frame numbers. However, the invention is not limited thereto.

As time progresses, the counting value of the counter unit 123 gradually increases. In step S402, the calculation unit 122 identifies current timing according to the counting value of the counter unit 123. If the counting value of the frame numbers is smaller than 8, it represents that the current timing still stays during the first frame period T1, the touch sensing method would proceed to step S404. In step S404, the calculation unit 122 continuously receives variations of capacitances inputted by the touch panel 110. Until the counting value of the frame numbers is equal to 8, the touch sensing method would proceed to step S406. In step S406, the calculation unit 122 calculates the average value AV1 of the touch object 300.

In the meanwhile, the counter unit 123 continuously counts the frame numbers of the touch panel 110. In step S408, if the counting value of the frame numbers is smaller than 20, it represents that the current timing still stays during the second frame period T2, the touch sensing method would proceed to step S410. In step S410, the calculation unit 122 continuously receives variations of capacitances inputted by the touch panel 110. Until the counting value of the frame numbers is equal to 20, the touch sensing method simply proceeds to step S412. In step S412, the calculation unit 122 calculates the amplitude value AP1 of the touch object 300.

Thereafter, in step S414, the determination unit 124 determines whether the amplitude value AP1 is larger than a preset amplitude value N to determine whether the touch object 300 is the target to be sensed. If the amplitude value AP1 is larger than the preset amplitude value N, it represents that the touch object 300 is the target to be sensed. For example, in FIG. 3A, the amplitude value AP1 of the touch object 300 is larger than the preset amplitude value N, and then, in step S416, the determination unit 124 determines the touch object 300 is the user's finger or the stylus, which is the target to be sensed.

On the contrary, if the amplitude value AP1 is smaller than the preset amplitude value N, it represents that the touch object 300 is not the target to be sensed. For example, in FIG. 3B, the amplitude value AP2 of the touch object 300 is smaller than the preset amplitude value N, and then, in step S418, the determination unit 124 determines the touch object 300 is the oil smudge of the touch object or other dirt, which is not the target to be sensed.

Then, in step S420, the counting value of the counter unit 123 would be reset to 0. The touch sensing method would return to step S400, and enters into the first frame period T1 to proceed the touch sensing of next stage.

In the present embodiment, compared with users' fingers or styluses, oil smudge of touch objects and other dirt are not the target to be sensed by the touch panel 110, but the invention is not limited thereto. In other embodiments, once the touch object is determined by the determination unit 124, and the amplitude value of the touch object is larger than the preset amplitude value, then the touch object is the target to be sensed, and is not limited to users' fingers or styluses.

Furthermore, the embodiment shown in FIG. 3A and FIG. 3B is variations of capacitances of the sensing channels 112 in X-direction. The touch sensing method for sensing variations of capacitances of the sensing channels 114 in Y-direction is sufficiently taught, suggested, and embodied in the embodiments illustrated in FIG. 3A to FIG. 4, and therefore no further description is provided herein.

In summary, in the exemplary embodiments of the invention, the touch sensing apparatus respectively calculates the average value and the amplitude value of the touch values generated by the touch object on the touch panel during different frame periods. Because different touch objects have different amplitude values, the touch sensing apparatus can properly determines whether the touch object is a target to be sensed.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch sensing method, adapted for a touch panel, the touch sensing method comprising:
calculating an average value of touch values generated by a touch object on the touch panel during a first frame period;
calculating an amplitude value of the touch values generated by the touch object on the touch panel based on the average value during a second frame period, wherein the average value is the same during the first frame period and the second frame period; and
comparing the amplitude value of the touch values to a preset amplitude value to determine whether the amplitude value is larger than the preset amplitude value, so as to determine whether the touch object is a target to be sensed based on the amplitude value,
wherein the amplitude value of the touch values is one peak-to-peak value of variations of capacitances between the first frame period and the second frame period generated by the touch object on the touch panel.

2. The touch sensing method as claimed in claim 1, further comprising:
determining whether the touch values generated by the touch object on the touch panel are larger than a preset threshold value,
wherein when the touch values are larger than the preset threshold value, the average value of the touch values generated by the touch object is calculated during the first frame period.

3. The touch sensing method as claimed in claim 2, wherein the touch values are the variations of capacitances generated by the touch object on the touch panel.

4. The touch sensing method as claimed in claim 1, wherein the first frame period and the second frame period respectively comprise a plurality of frame numbers.

5. The touch sensing method as claimed in claim 4, further comprising:
counting the frame numbers to respectively define the first frame period and the second frame period.

6. A touch sensing apparatus, adapted for a touch panel, the touch sensing apparatus comprising:
a calculation unit calculating an average value of touch values generated by a touch object on the touch panel during a first frame period, and calculating an amplitude value of the touch values generated by the touch object on the touch panel based on the average value during a second frame period, wherein the average value is the same during the first frame period and the second frame period; and
a determination unit determining whether the touch object is a target to be sensed based on the amplitude value, wherein the determination unit determines whether the amplitude value of the touch values is larger than a preset amplitude value to determine whether the touch object is the target to be sensed,
wherein the amplitude value of the touch values is one peak-to-peak value of variations of capacitances between the first frame period and the second frame period generated by the touch object on the touch panel.

7. The touch sensing apparatus as claimed in claim 6, wherein the determination unit determining whether the touch values generated by the touch object on the touch panel are larger than a preset threshold value, and when the touch values are larger than the preset threshold value, the calculation unit calculates the average value of the touch values generated by the touch object during the first frame period.

8. The touch sensing apparatus as claimed in claim 7, wherein the touch values are the variations of capacitances generated by the touch object on the touch panel.

9. The touch sensing apparatus as claimed in claim 6, wherein the first frame period and the second frame period respectively comprise a plurality of frame numbers.

10. The touch sensing apparatus as claimed in claim 9, wherein the calculation unit comprises:
a counter unit counting the frame numbers to respectively define the first frame period and the second frame period.

* * * * *